(12) United States Patent
Lee et al.

(10) Patent No.: US 11,374,492 B2
(45) Date of Patent: Jun. 28, 2022

(54) INTEGRATION CIRCUIT AND CONTROL METHOD AND APPARATUS

(71) Applicant: MagnaChip Semiconductor Ltd., Cheongju-si (KR)

(72) Inventors: Jang Hyuck Lee, Seongnam-si (KR); Joo Han Yoon, Seongnam-si (KR); Byoung Kwon An, Seoul (KR); Jay Lee, Seongnam-si (KR)

(73) Assignee: MagnaChip Semiconductor, Ltd., Cheongju-si (KR)

(*) Notice: Subject to any disclaimer, the term of this patent is extended or adjusted under 35 U.S.C. 154(b) by 42 days.

(21) Appl. No.: 16/830,939

(22) Filed: Mar. 26, 2020

(65) Prior Publication Data
US 2021/0021191 A1      Jan. 21, 2021

(30) Foreign Application Priority Data

Jul. 19, 2019   (KR) .................. 10-2019-0087916

(51) Int. Cl.
  *H02M 3/156*   (2006.01)
  *H05B 45/37*   (2020.01)
(52) U.S. Cl.
  CPC ............ *H02M 3/156* (2013.01); *H05B 45/37* (2020.01)

(58) Field of Classification Search
None
See application file for complete search history.

(56) References Cited

U.S. PATENT DOCUMENTS

| | | | | |
|---|---|---|---|---|
| 5,157,321 | A * | 10/1992 | Kato | H02J 7/2434 322/28 |
| 9,502,975 | B2 | 11/2016 | Shin et al. | |
| 9,621,038 | B2 * | 4/2017 | Cui | G05F 1/46 |
| 2015/0256068 | A1 | 9/2015 | Shin et al. | |
| 2016/0301307 | A1 * | 10/2016 | Huang | H02M 3/156 |

FOREIGN PATENT DOCUMENTS

KR   10-2015-0106044 A   9/2015
KR       10-2084801 B1   3/2020

* cited by examiner

*Primary Examiner* — Jeffrey A Gblende
(74) *Attorney, Agent, or Firm* — NSIP Law

(57) ABSTRACT

An integration circuit is provided. The integration circuit includes a current source, a capacitor connected in series with the current source, a voltage source bias connected in series with the capacitor, a switch configured to connect a first node between the current source and the capacitor and a second node between the capacitor and the voltage source bias; and a switch control logic unit configured to control an on/off operation of the switch, wherein an integration operation is performed by the current source and the capacitor.

17 Claims, 10 Drawing Sheets

| C fusing | C | gm fusing | gm |
| C fusing | C | gm fusing | gm |
|  |  |  | comp | SW |
| logic for fusing | | | | SW |

INTEGRATION CIRCUIT AND CONTROL METHOD AND APPARATUS

CROSS-REFERENCE TO RELATED APPLICATIONS

This application claims the benefit under 35 U.S.C. 119(a) of Korean Patent Application No. 10-2019-0087916 filed on Jul. 19, 2019 in the Korean Intellectual Property Office, the entire disclosure of which is incorporated herein by reference for all purposes.

BACKGROUND

1. Field

The following description relates to an integration circuit and control method and apparatus.

2. Description of Related Art

Technology is currently being developed to miniaturize the size of signal processing apparatuses such as analog-to-digital (A/D) converters, light emitting diodes (LEDs), backlight drive apparatuses and display apparatuses, and specifically, to design these apparatuses with a thin form factor. Additionally, there is a desire to reduce the sizes of the various devices mounted in the apparatuses.

Additionally, it is preferable that the size of the devices is minimized in order to reduce power consumption caused by devices that have a large size, or to mount more devices (e.g., chips or microchips) to diversify the functions of the devices.

Apparatuses may be equipped with various devices or chips, one of which may be an integration circuit. An integration circuit may include two current sources, two capacitors connected in series with each of the current sources, and one comparator connected to each node between the current source and the capacitor.

The integration circuit may have a first current source for supplying a gm*$V_{CS}$ (current sensing voltage) current and a second current source for supplying a gm*$V_{REF}$ (reference voltage) current. The integral calculated value is divided into a first integral value in the form of a parabola by a gm*$V_{CS}$ current and a capacitor, and a second integral value in a form of a specific slope by a gm*$V_{REF}$ current and capacitor. A current control switch of the integration circuit may be turned off when the magnitude of the first integral value and the second integral value are equal. Since the $V_{CS}$ current is affected by the internal CS terminal, its current value changes.

However, in the integration circuit, the two current sources and the two capacitors may have different values, respectively, due to manufacturing problems or prolonged use. This can cause a change of the switch turn-off timing, resulting in a change in the accuracy of the system. Accordingly, the integration circuit may not have a constant operating time, so that the average current control may not be performed stably.

Typically, a fusing circuit may be added to the integration circuit to compensate accuracy. The fusing circuit may refer to a first fusing circuit for compensating for the difference between gm values of the first current source and the second current source, and a second fusing circuit for compensating for the difference between the two capacitor values. The first fusing circuit may connect additional current sources in parallel with the existing current source, the second fusing circuit may connect additional capacitors in parallel with the existing capacitor. There may be at least three to four additional current sources or capacitors.

However, as the fusing circuit is further configured in the integration circuit as described above, the size of the integration circuit may not decrease, and the size of the device may not be reduced.

Since the alternative integration circuit may be provided with two current sources and two capacitors, a difference in current source values, or a difference in capacitor values occurs, therefore, the integration circuit may not have a constant operating time. Additionally, the fusing circuit may be further configured in order to compensate for the difference value. Accordingly, the configuration of the integration circuit may not be simplified, and the chip size may not be minimized.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an integration circuit includes a current source, a capacitor connected in series with the current source, a voltage source bias connected in series with the capacitor, a switch configured to connect a first node between the current source and the capacitor and a second node between the capacitor and the voltage source bias; and a switch control logic unit configured to control an on/off operation of the switch, wherein an integration operation is performed by the current source and the capacitor.

The switch control logic unit may include an inversion buffer and an AND gate, and the switch control logic is configured to be in a non-operational state when an output of the AND gate is at a high level.

The current source may be configured to supply a current gm*($V_{REF}$−$V_{CS}$) value based on a difference between a reference voltage $V_{REF}$ and a current sensing voltage $V_{CS}$ to the first node.

The voltage source bias may be configured to maintain a constant value of the second node.

An integral value calculated from the integration operation may have a semicircular shape that is symmetrical with respect to a time when the reference voltage $V_{REF}$ and the current sensing voltage $V_{CS}$ are equal.

The circuit may further include a comparator configured to alternately output a turn-off signal and a turn-on signal to the switch when the integral calculated integral value and the voltage source bias are equal.

A turn-on time of the switch may remain constant when a transfer conductance value (gm) of the current source is changed or when a size of the capacitor is changed.

An operating time of the integration circuit may remain constant when a transfer conductance value (gm) of the current source or a size of the capacitor is changed.

In a general aspect, a control method of an integration circuit includes supplying, by a current source, a current based on a difference between a reference voltage $V_{REF}$ and a current sensing voltage $V_{CS}$, performing an integral calculation by the current source and a capacitor connected in series with the current source; and performing a turn-off operation and a turn-on operation of a switch when an integral value of the integral calculation and the voltage source bias are equal, wherein the current sensing voltage $V_{CS}$ increases with a predetermined time while a voltage source bias maintains a constant value.

A value at which the integral value increases, and a value at which the integral value decreases may be identical to each other with respect to a time at which the reference voltage $V_{REF}$ and the current sensing voltage $V_{CS}$ are equal.

A time at which the switch is turned on may remain constant when a transfer conductance value (gm) of the current source is changed.

A time at which the switch is turned on may remain constant when a size of the capacitor is changed.

An operating time of the integration circuit may be constant when a transfer conductance value (gm) of the current source is changed, or a size of the capacitor is changed.

In a general aspect, a switch controller includes an integration circuit including a current source, a capacitor connected in series with the current source, a voltage source bias connected in series with the capacitor, a switch configured to connect a first node between the current source and the capacitor, and a second node between the capacitor and the voltage source bias, and a switch control logic unit configured to control an on/off operation of the switch, a comparator configured to compare a first integral value of the first node with a second integral value of the second node based on an integral calculation of the integration circuit, and output a switch-off signal SW_OFF to the switch control logic unit, an off-time controller configured to count an off-time based on an output of the comparator; and a switch driver configured to control an operation of the switch based on the output of the comparator and the off-time controller.

The integration circuit may be configured to operate based on an output signal of the off-time controller.

The off-time controller may be configured to output a logic signal, which has a predetermined level, to a set terminal of the switch driver after a predetermined time is counted based on an output signal of the comparator.

In a general aspect, an integration circuit includes a single current source, a voltage source bias, a single capacitor connected in series with the single current source, and configured to perform an integration operation with the single current source; and a switch configured to connect a first node between the current source and the capacitor with a second node between the capacitor and the voltage source bias.

The circuit may further include a switch control logic unit configured to control on/off operations of the switch.

The circuit may further include a comparator configured to compare a first integral value of the first node with a second integral value of the second node based on an integral calculation of the integration circuit, and output a switch-off signal SW_OFF to the switch control logic unit.

Other features and aspects will be apparent from the following detailed description, the drawings, and the claims.

Figure 1:
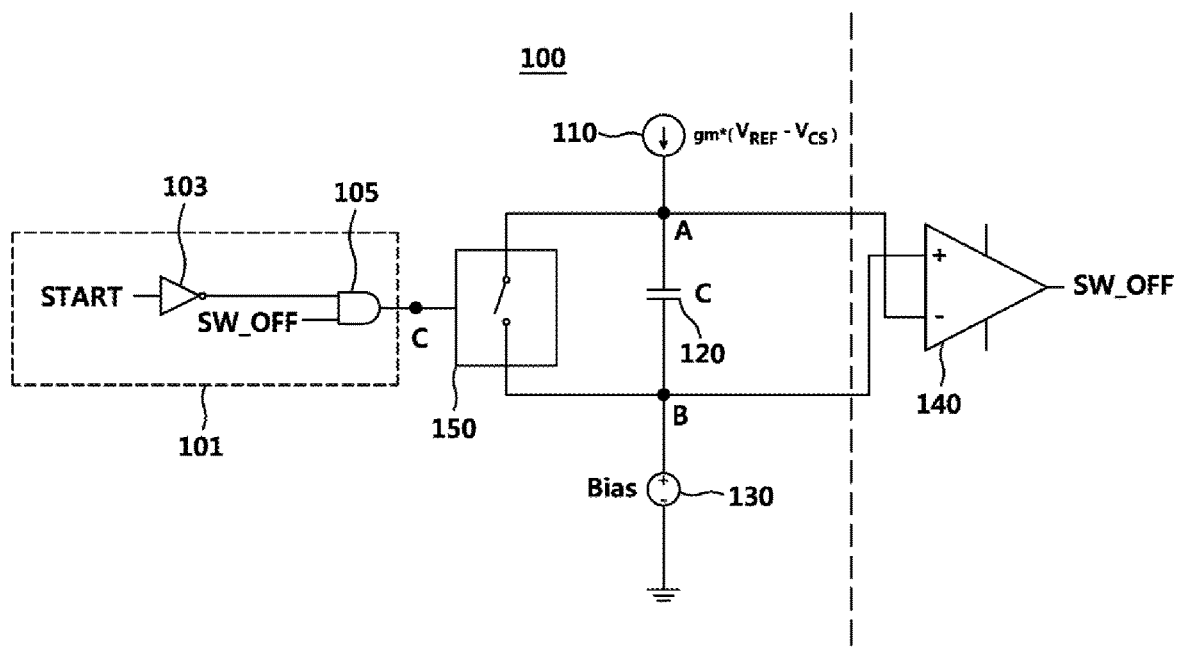
FIG. 1 illustrates an example of an integration circuit, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

As used herein, an expression representing a portion, such as "portion" or "part", may include a device in which a corresponding component may include a specific function, software that may include a specific function, or a combination of devices and software that may include a specific function, but not necessarily limited to the described function which is merely provided to help a more comprehensive understanding of the disclosure, Those who have a common knowledge in the field may perform a variety of modifications and variations from this description.

Unless otherwise defined, all terms, including technical and scientific terms, used herein have the same meaning as commonly understood by one of ordinary skill in the art to which this disclosure pertains after an understanding of the disclosure of this application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Additionally, all electrical signals used in the present disclosure are examples. In the examples, the sign of all the electrical signals described hereinbelow may be reversed if the circuit of the present examples further includes an inverter. Therefore, the scope of the present disclosure is not limited to the direction of the signal.

Therefore, the spirit of the present disclosure should not be limited to the examples described, and all of the equivalents or equivalents of the claims as well as the following claims belong to the scope of the present disclosure.

Hereinafter, the present disclosure will be described in more detail with reference to the examples illustrated in the accompanying drawings. The present disclosure provides an integration circuit that may have a reduces size compared to the existing integration circuit, but may also perform the normal operations of the integration circuit. The integration circuit will be described with reference to FIG. 1.

FIG. 1 illustrates an example of an integration circuit 100, in accordance with one or more embodiments.

Referring to FIG. 1, the integration circuit 100 in an example may include a current source 110 that supplies a current $gm^*(V_{REF}-V_{CS})$ that is based on the difference between the reference voltage $V_{REF}$ and the current sensing voltage $V_{CS}$, a capacitor 120 (C) sequentially connected in series with the current source 110, and a voltage source bias 130 as a voltage source. One end of the voltage source bias 130 is grounded. Here, the use of the term "may" with respect to an example or embodiment, e.g., as to what an example or embodiment may include or implement, means that at least one example or embodiment exists where such a feature is included or implemented while all examples and embodiments are not limited thereto.

Referring further to FIG. 1, the integration circuit 100 may further include a switch 150 connecting a node A between the current source 110 and the capacitor 120 and a node B between the capacitor 120 and the voltage source bias 130, and a switch control logic unit 101 that controls the on/off operation of the switch 150.

The switch control logic unit 101 may include an inversion buffer 103 and an AND gate 105 that is a logic device. In an example, the inversion buffer 103 and the AND gate 105 are configured as an integration circuit 100. However, an input signal applied to the inversion buffer 103 and the AND gate 105 may be received from another circuit constituting the integration circuit.

As discussed with reference to FIG. 10 below, for example, if the switch control circuit 260 includes an integration circuit, the input signal applied to the inversion buffer 103 and the AND gate 105 may be a control signal of the switch driver 262 that controls a turn-on operation of a current control switch 240. The switch driver 262 outputs the control signal by performing a logical operation on the output of the comparator 140 and the output of the off-time controller 261.

According to the example, the driving of the integration circuit 100 may be determined according to the level state of the output node C of the AND gate 105. In other words, when the node C of the AND gate 105 is at a high level, the integration circuit 100 may remain in a non-operational state for a predetermined time, while the integration circuit 100 operates for a predetermined time when the node C of the AND gate 105 is at a low level. The level change of the node C by the switch control logic unit 101 is illustrated in Table 1 below.

TABLE 1

| SW_OFF | START | NODE C |
| --- | --- | --- |
| LOW | LOW | LOW |
| LOW | HIGH | LOW |
| HIGH | LOW | HIGH |
| HIGH | HIGH | LOW |

As described above, in an example, the integration circuit 100 may include a current source 110, a capacitor 120, a voltage source bias 130, and a switch control logic unit 101. The integration circuit 100 of the examples, differs from the typical integration circuit since the integration circuit 100 of the examples may include only one current source 110 and one capacitor 120. Additionally, there is a difference in the configuration of the integration circuit 100 of the examples herein and the typical integration circuit in that a fusing circuit is not necessary in the integration circuit 100 of the examples herein. In the typical integration circuit, the fusing circuit is provided in order to compensate for deficiencies resulting from a difference between the values of the current source and the capacitor. It is noted that the typical integration circuit, includes two current sources and two capacitors, while the example integration circuit 100 may include only one current source 110 and one capacitor 120.

As illustrated in FIG. 1, the comparator 140 may be connected to the integration circuit 100. Connection of the integration circuit 100 and the comparator 140 may have a configuration in which the node A is connected to the inverting terminal (−), the node B is connected to the non-inverting terminal (+), and the switch-off signal SW_OFF which is the output of the comparator 140 is applied to the AND gate 105.

Next, the operation of the integration circuit of an example configured as above will be described. The description will be made by comparing the graphs according to the operation of the integration circuit of an example and the typical integration circuit so that the difference between the integration circuit of an example and the typical integration circuit may be discerned.

Figure 2A:
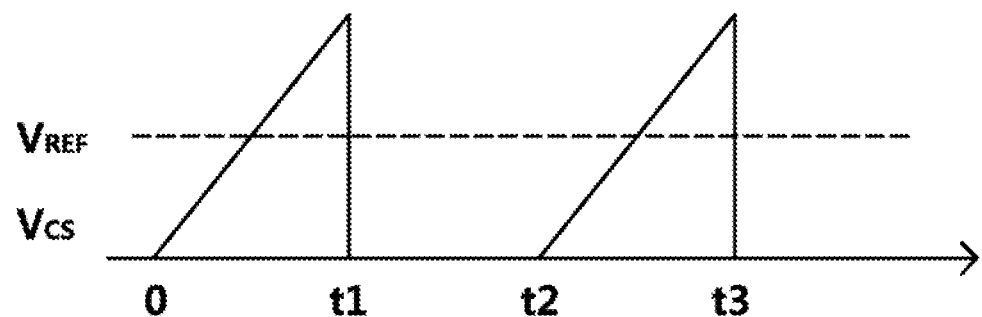
FIG. 2A illustrates an example of an operation graph of an integration circuit showing the relationship between a reference voltage $V_{REF}$ and a current sensing voltage $V_{CS}$, in accordance with one or more embodiments.
Figure 2B:
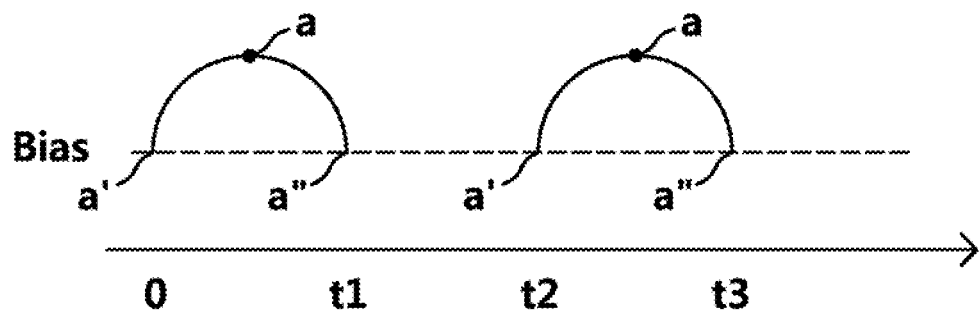
FIG. 2B illustrates an example of an operation graph of an integration circuit showing a first integral value and a second integral value, in accordance with one or more embodiments.
Figure 2C:
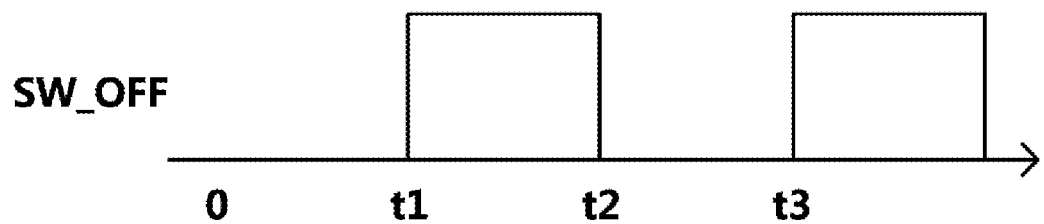
FIG. 2C illustrates an example of an operation graph of an integrated circuit indicating a switch operation status, in accordance with one or more embodiments.

FIGS. 2A-2C illustrate examples of an operation graph of the example integration circuit. Specifically, FIG. 2A illustrates the relationship between the reference voltage $V_{REF}$ and the current sensing voltage $V_{CS}$, FIG. 2B illustrates the first integral value and the second integral value, and FIG. 2C illustrates an example of a switch operating state.

Referring to FIG. 2A, the reference voltage ($V_{REF}$) may maintain a constant value, and the current sensing voltage ($V_{CS}$) may increase at a predetermined slope for a predetermined time (0~t1, t2~t3, t4~t5, . . . ). When the integral calculation is performed in this state, the 'first integral value' at node A may appear as a symmetrical semicircle by the relation 'gm*($V_{REF}$−$V_{CS}$)' which is the supply current of the current source 110 and the capacitor 120, as illustrated in FIG. 2B.

That is, referring to FIG. 2B, with respect to the time "a" when the reference voltage $V_{REF}$ and the current sensing voltage $V_{CS}$ are equal to each other, when the reference voltage $V_{REF}$ is greater than the current sensing voltage $V_{CS}$, the first integral value increases, and conversely, when the reference voltage $V_{REF}$ is less than the current sensing voltage $V_{CS}$, the first integral value decreases, therefore, being symmetrical with respect to the time "a".

Node B of the integration circuit 100 may maintain a constant value based on the bias voltage. In the example, the bias voltage will be referred to as a 'second integral value'.

FIG. 2C illustrates a turn-on and turn-off state of the switch 150. Referring to FIGS. 2B and 2C together, the switch 150 is turned off at the time a' when the first and second integral values are equal, and remains at a low level for a predetermined time (0 to t1, t2 to t3). This state refers to a state when the node C is LOW in Table 1, and a time period (0 to t1, t2 to t3) in which the integration circuit is substantially operated.

In an example, the switch may be turned on to stop the operation of the integration circuit at a time a" at which the first integral value and the second integral value are again equal. This state is referred to as the time when the node C is HIGH in Table 1, and corresponds to the time period between t1 and t2.

The switch may be turned off again at the time t2 to start the integration, and may be maintained until the time t3.

Such time periods in which an integral calculation of an integration circuit is performed (0 to t1, t2 to t3), and an integral calculation of an integration circuit is not performed (t1 to t2) may be repeatedly generated.

When such an integral calculation is performed, the gm value or the capacitor value of the example integration circuit may also vary. Additionally, the time at which the switch of the example integration circuit is turned on may not vary. This will be described with reference to FIGS. 3 and 4.

Figure 3A:
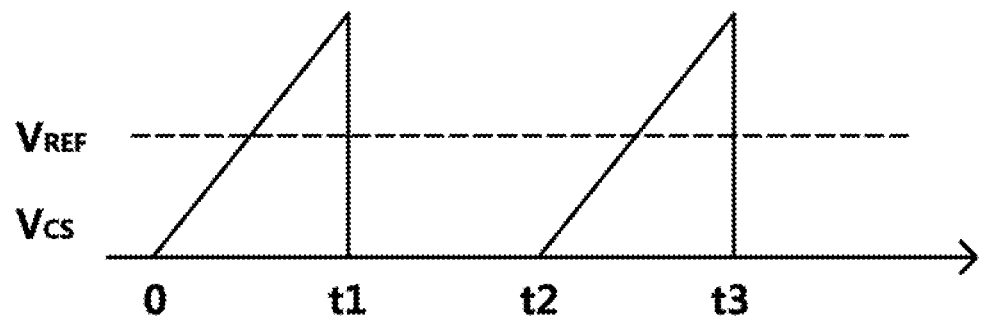
FIGS. 3A, 3B, and 3C are examples of graphs illustrating a switch operating state when gm value of the current source provided in the integration circuit of is changed, in accordance with one or more embodiments.
Figure 3B:
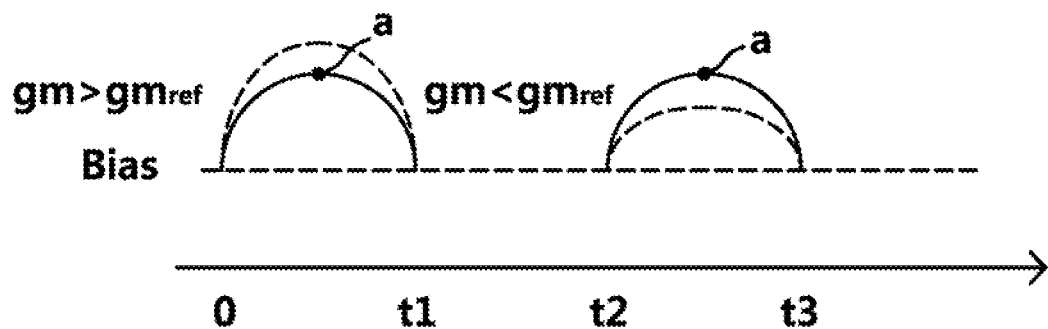
Figure 3C:
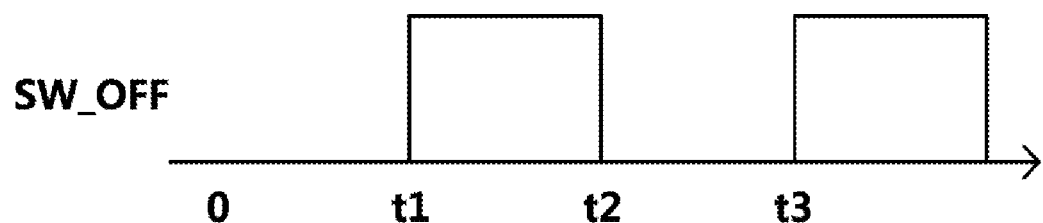

FIGS. 3A-3C are graphs illustrating a switch operating state when the gm value of the current source provided in the example integration circuit is changed. Since the example integration circuit may only have one current source, it may not be compared with other gm values, but the gm value may vary due to process dispersion or similar processes.

As illustrated in FIG. 3A, the reference voltage $V_{REF}$ may maintain a constant value, and the current sensing voltage $V_{CS}$ may increase with a predetermined slope for a predetermined time (0 to t1, t2 to t3, t4 to t5, . . . ).

FIG. 3B illustrates a state of integral value change according to the integral calculation. When the integral calculation is performed, a bias which is the second integral value may maintain a constant value. On the other hand, when the gm value is changed due to the process dispersion of gm, the value of 'gm*($V_{REF}$−$V_{CS}$)*C', which is the supply current of the current source that is the first integral value, is changed.

However, even if the gm value is greater than the preset reference value ($gm_{ref}$) ($gm>gm_{ref}$), or less than the preset reference value ($gm_{ref}$) ($gm<gm_{ref}$), the gm value may change symmetrically with respect to the time "a" at which the reference voltage $V_{REF}$ and the current sensing voltage $V_{CS}$ are the same, so that the increase and decrease values of the integral calculated value appear to be the same.

In other words, in both cases where the gm value is greater than the preset reference value ($gm_{ref}$) ($gm>gm_{ref}$) or less than the preset reference value ($gm_{ref}$) ($gm<gm_{ref}$), the first integral value may be increased while the reference voltage $V_{REF}$ is greater than the current sensing voltage $V_{CS}$, and the first integral value may decrease while the reference voltage $V_{REF}$ becomes less than the current sensing voltage $V_{CS}$ as the reference voltage $V_{REF}$ and the current sensing voltage $V_{CS}$ pass through the same time "a". Therefore, the width of the first integral value may not change, and may only fluctuate in the vertical direction (dotted portion) as illustrated in FIG. 3B.

Therefore, regardless of the change of the gm value, the time of the turn-on operation (t1, t3) of the switch 150 may not change. Since the turn-on (t1, t3) time is constant, the holding time (0 to t1, t2 to t3) of the turn-off state may also be constant. Accordingly, the operating time of the integration circuit may be constant.

Accordingly, since the example integration circuit may have a simple configuration compared to the typical integration circuit, there may not be a change in the accuracy of the system, and an additional fusing circuit may not be necessary.

In contrast, the operation of the typical integration circuit will be described with reference to FIGS. 4A-4C and FIGS. 5A-5C.

Figure 4A:
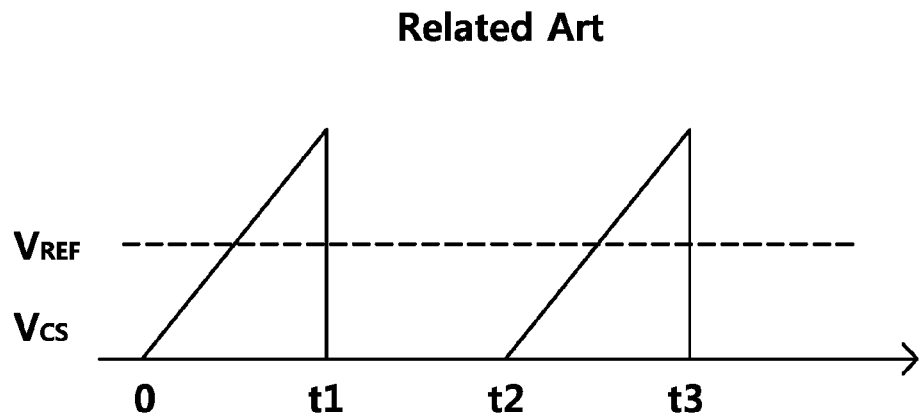
FIGS. 4A, 4B, 4C, 5A, 5B, and 5C are examples of graphs illustrating an operating state when the values of a first current source and a second current source are changed in a typical existing integration circuit.
Figure 4B:
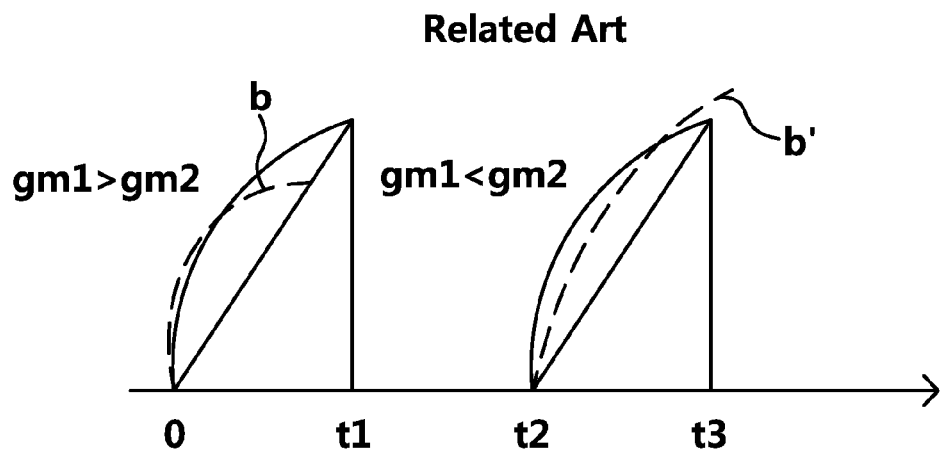
Figure 4C:
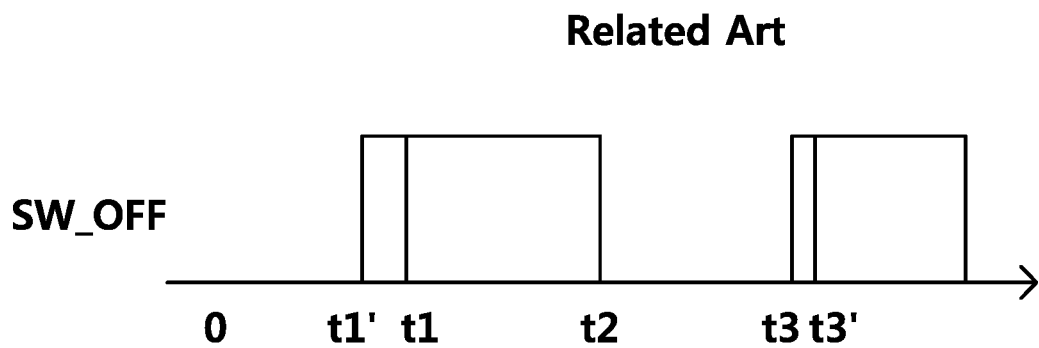
Figure 5A:
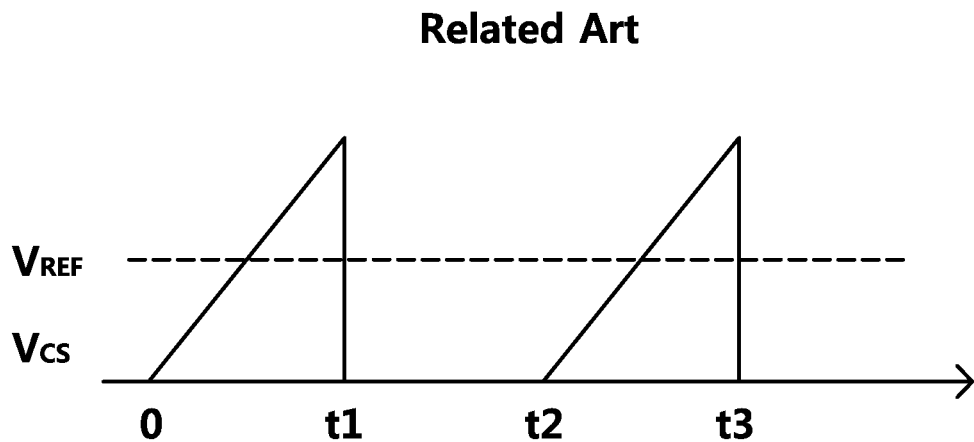
Figure 5B:
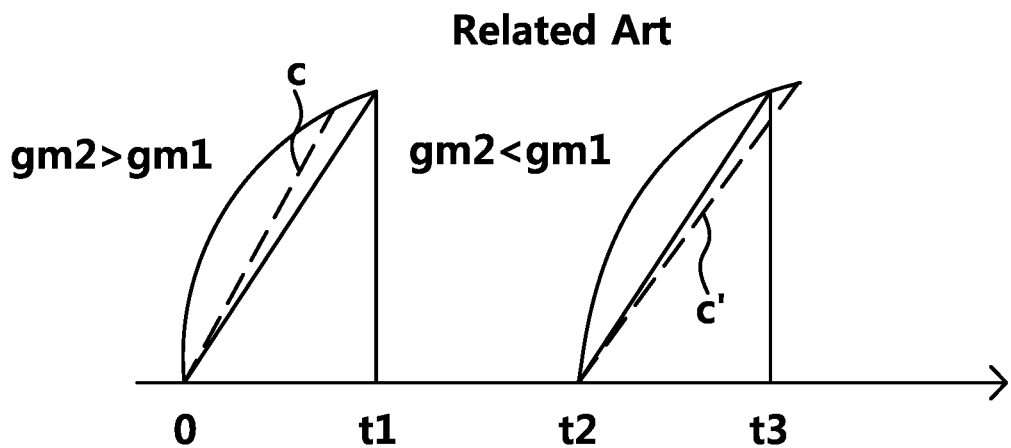
Figure 5C:
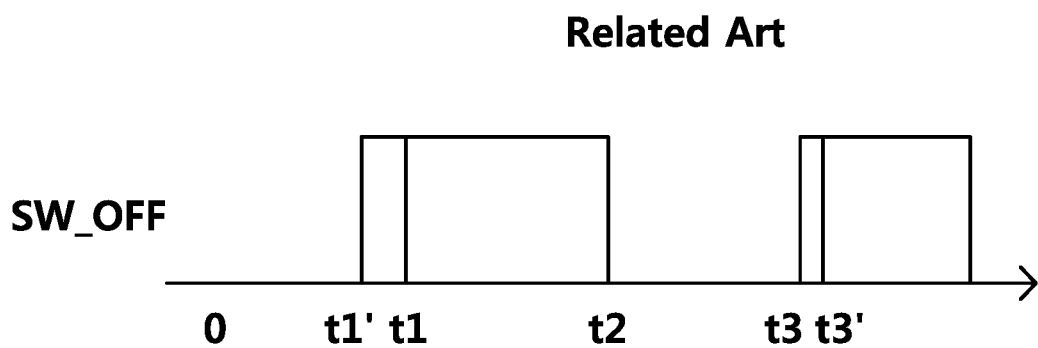

In the typical integration circuit, two current sources are configured, and FIGS. 4A-4C illustrate that the gm1 value of the first current source is greater than the gm2 value of the second current source (gm1>gm2), or less than the gm2 value of the second current source (gm1<gm2). FIGS. 5A-5C illustrate that the gm2 value of the second current source is greater than the gm1 value of the first current source (gm2>gm1), or less than the gm1 value of the first current source (gm2<gm1).

In FIGS. 4A-4C, when the gm1 value of the first current source is changed to be greater than the gm2 of the second current source (gm1>gm2), the first integral value "b" becomes shorter. Accordingly, the time when the switch 150 is turned on is faster than the normal time t1, and is turned on at the time t1'. Similarly, when the gm1 value of the first current source is less than the gm2 of the second current source (gm1<gm2), the first integral value "b" becomes longer. Accordingly, the time when the switch 150 is turned on becomes slower than the normal time t3 that it is turned on at the time t3'. The change of the turn-on time means that the operation time of the integration circuit is changed according to the difference between gm1 and gm2 values.

The same may be applied when the gm2 value of the second current source of FIG. 5 is changed. If the gm2 value of the second current source is changed to be greater than the gm1 of the first current source, the slope "c" of the second integral value may be further inclined. Therefore, the time when the switch 150 is turned on is faster than the normal time t1, and is turned on at the time t1'. On the other hand, if the gm2 value of the second current source is smaller than the gm1 of the first current source, the slope "c" of the second integral value will be gentler so that the time when the switch 150 is turned on is slower than the normal time t3, and is therefore turned on at time t3'.

As described above, in the typical integration circuit, the turn-on time of the switch 150 is changed from t1 or t3, which are normal times, to t1' or t3' according to the gm value. Therefore, a fusing circuit should be to be added to the integration circuit in order to compensate for the difference.

The example integration circuit according affects the accuracy of the system by changing the capacitor size, in addition to the gm value.

Figure 6A:
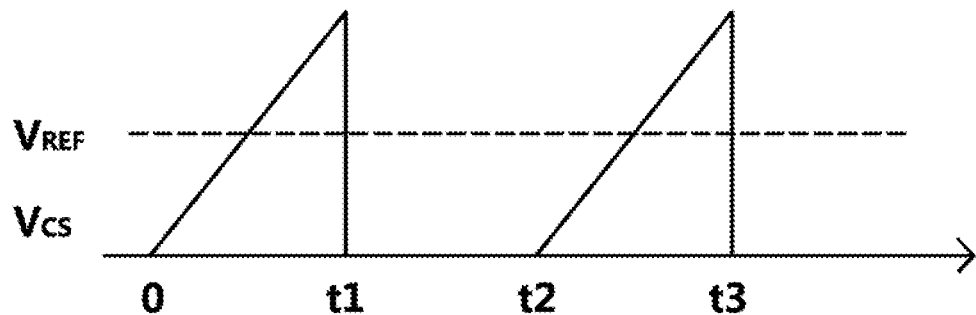
FIGS. 6A, 6B, and 6C are examples of graphs illustrating a switch operating state when the size of the capacitor provided in the integration circuit is changed, in accordance with one or more embodiments.
Figure 6B:
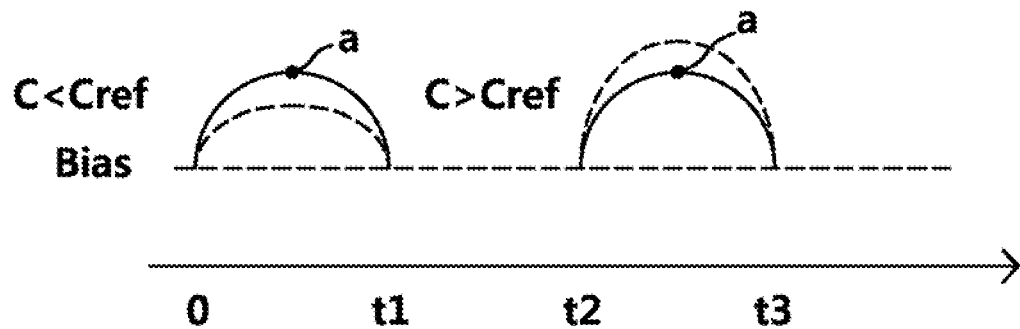
Figure 6C:
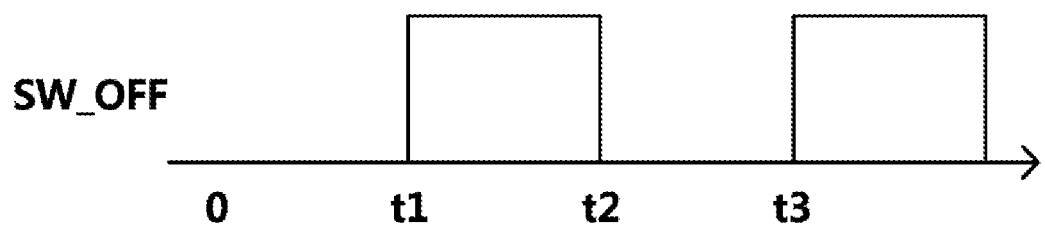

FIGS. 6A-6C are graphs illustrating a switch operation state when the size of the capacitor provided in the example integration circuit is changed. as discussed above, the example integration circuit may include only a single capacitor. However, the size of the capacitor may vary due to process dispersion or similar processes. When the size of the capacitor is changed, the value of the capacitor value may also change.

As illustrated in FIG. 6A, the reference voltage ($V_{REF}$) of the example integration circuit may maintain a constant value, and the current sensing voltage ($V_{CS}$) may increase with a predetermined slope for a predetermined time (0 to t1, t2 to t3, t4 to t5, etc.).

Referring to FIG. 6B, the state of change of the integral value according to the integral calculation is illustrated. When the integral calculation is performed, a bias, which is the second integral value, may maintain a constant value. Alternately, when the capacitor value is changed due to, e.g., process dispersion, the supply current of the current source '$gm*(V_{REF}-V_{CS})*C$', which is the first integral value, may be changed.

However, even if the value of the capacitor is greater than, or less than, the preset reference value Cref, the increase and decrease of the values of the first integral value, which is integral calculated, may appear to be the same since the change is symmetrical with respect to the time "a" at which the reference voltage $V_{REF}$ and the current sensing voltage $V_{CS}$ are equal.

In an example, in both examples where the value of the capacitor is less than the preset reference value Cref (C<Cref), or greater than the preset reference value Cref (C>Cref), the first integral value may be increased when the reference voltage $V_{REF}$ is greater than the current sensing voltage $V_{CS}$, and the first integral value may decrease when the reference voltage $V_{REF}$ is less than the current sensing voltage $V_{CS}$, with respect to the time "a". Therefore, the width of the first integral value may not change, but may only fluctuate in the vertical direction (the dotted portion) as illustrated in FIG. 6B.

Therefore, regardless of the change in the value of the capacitor, the turn-on time (t1, t3) of the switch 150 may not change. When the turn-on time (t1 and t3) is constant, the holding time (0 to t1, t2 to t3) of the turn-off state may be constant. That is, the operating time of the integration circuit may be provided constantly.

In contrast, the operation in the typical integration circuit will be described with reference to FIGS. 7A-7C and 8A-8C.

In the typical integration circuit, two capacitors C1 and C2 may be respectively connected to different nodes, and when there is a difference in size between the size of a capacitor connected to a first node and the size of a capacitor connected to a second node, the holding time of the turn-on of the switch 150 may be different from between the two capacitors. Specifically, the operating time of the integration circuit depends on the difference in size between the capacitors C1 and C2.

Figure 7A:
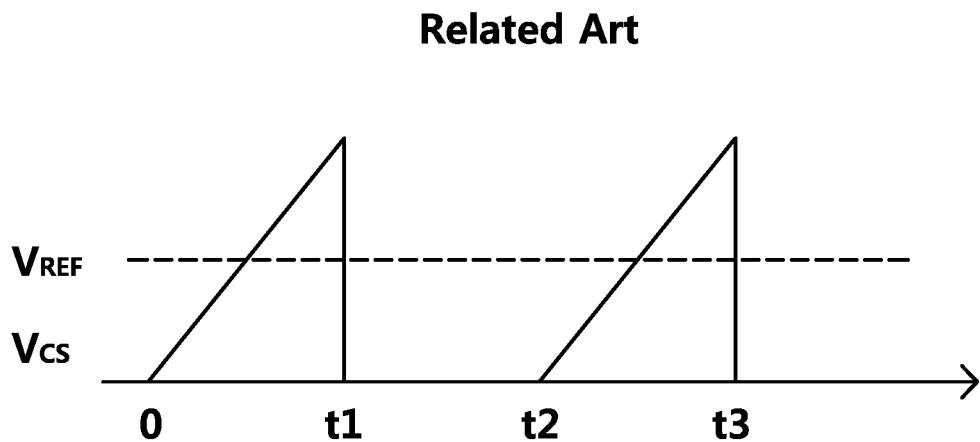
FIGS. 7A, 7B, 7C, 8A, 8B, and 8C are examples of graphs illustrating an operating state when the values of the first capacitor and the second capacitor are changed in a typical integration circuit.
Figure 7B:
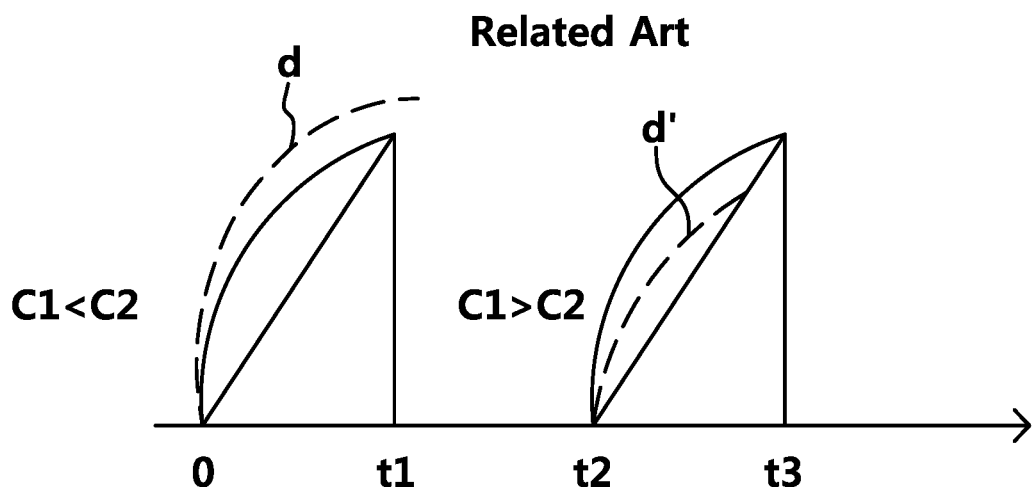
Figure 7C:
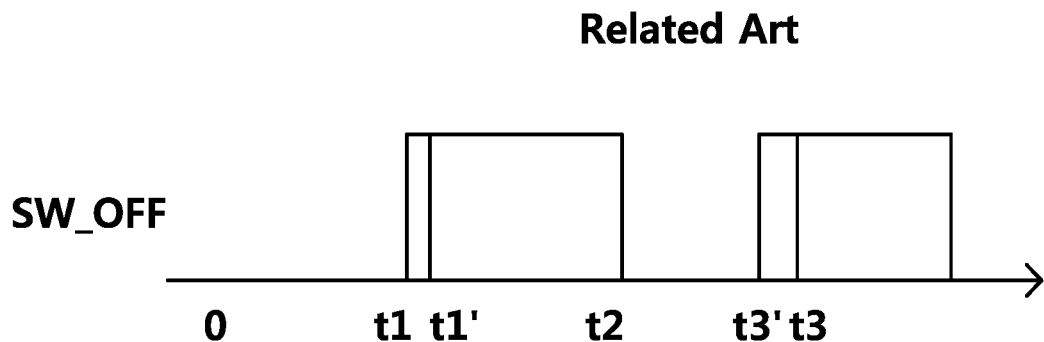

FIGS. 7A-7C illustrate an example in which a size of a capacitor C1 connected to a first node is less than a size of a capacitor C2 connected to a second node (C1<C2), or greater than a size of a capacitor C2 connected to the second node (C1>C2). When the size of the first capacitor C1 is less than the size of the second capacitor C2 (C1<C2), the first integral value d becomes longer. As a result, the switch is turned on at the time t1' which is slower than the normal time t1. On the other hand, when the size of the first capacitor C1 is greater than the size of the second capacitor C2 (C1>C2), the first integral value d' is shortened, and the time at which the switch is turned on is faster than the normal time t3, so the switch is turned on at t3'.

Figure 8A:
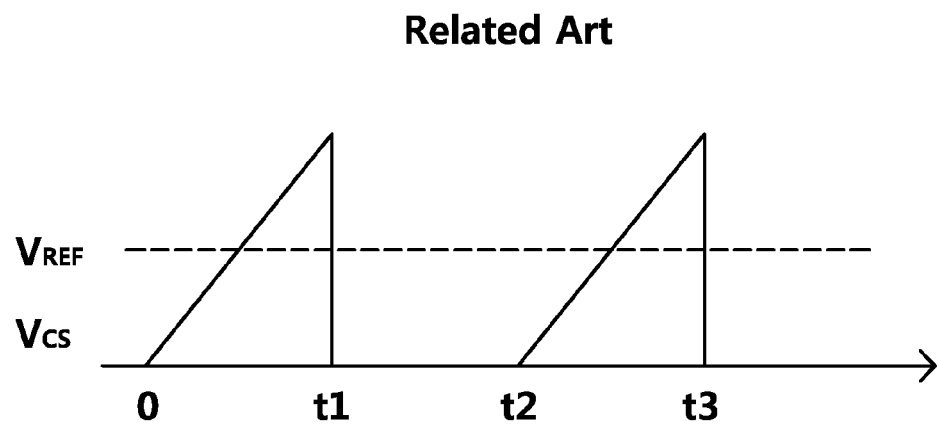
Figure 8B:
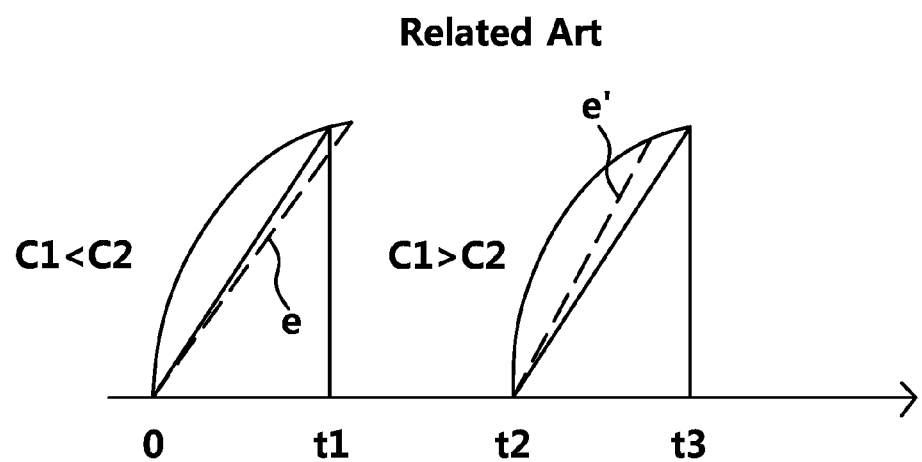
Figure 8C:
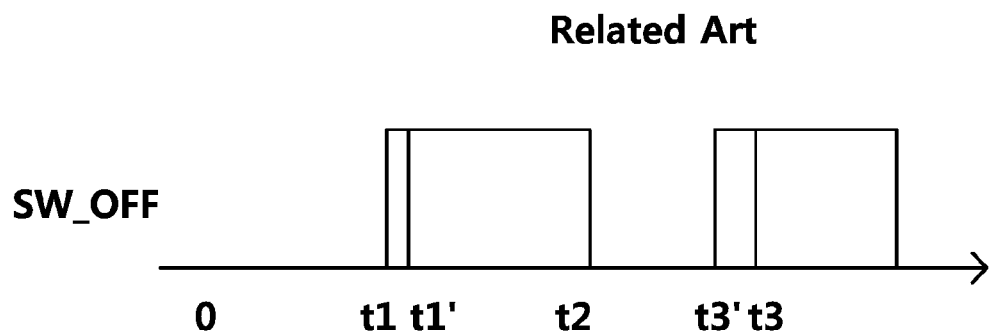

FIGS. 8A-8C illustrate an example in which the size of the second capacitor C2 is less than the size of the first capacitor (C2<C1), or greater than the size of the first capacitor C1 (C2>C1). When the size of the second capacitor C2 is greater than the size of the first capacitor C1 (C2>C1), the slope e of the second integral value may be more gentle, and thus the switch 150 may be turned on at the time t1' which is slower than the normal time t1. On the other hand, if the size of the second capacitor C2 is less than the size of the first capacitor C1 (C2<C1), the slope e' of the second integral value becomes more inclined so that the switch 150 is turned on at the time t3' which is faster than the normal time t3.

As described above, in the typical integration circuit, the time at which the switch 150 is turned on may be changed from the normal time t1 or t3 to t1' or t3' according to the value of the capacitor. Therefore, even if the value of the capacitor is changed, a fusing circuit may have to be added to the typical integration circuit.

In the integration circuit described above, when the gm value or the capacitor value of the current source is changed, the time at which the switch 150 is turned on may change. Accordingly, the fusing circuit may have to be added to compensate for the changed value so that the configuration of the integration circuit may not be simplified.

On the other hand, the example integration circuit may not include a fusing circuit, because the time at which the switch 150 is turned on may be maintained constantly even if the gm value or the value of the capacitor is changed, and thus the example integration circuit is simplified and the size of the example integration circuit may be reduced.

Additionally, although the example integration circuit is simplified as described above, the turn-on period and the turn-off period of the switch 150 may be maintained constant even if the gm value or the value of the capacitor changes so that there is no notable difference with the function of the typical integration circuit.

Figures 9A, 9B:
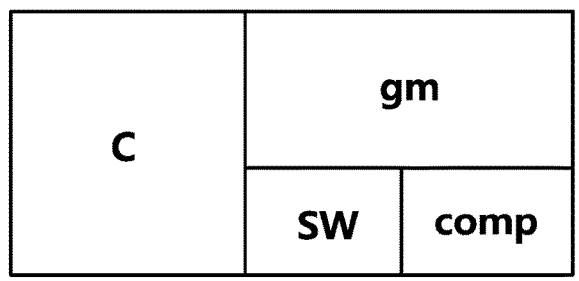
FIGS. 9A and 9B illustrates examples of comparing the lay-outs of an example integration circuit device, and a typical integration circuit device.

FIGS. 9A and 9B illustrate examples of comparing the layout of the typical integration circuit and the example integration circuit. The layout of FIGS. 9A and 9B include a comparator.

The typical integration circuit illustrated in FIG. 9A may include: two current sources (gm), two capacitors (C), one comparator (comp), two switches (SW), fusing circuits (gm fusing, C fusing) provided for each current source (gm) and the capacitor (C) in order to compensate for issues caused by the variation in the values of the current source (gm) and the capacitor (C), a logic for the fusing unit controlling the fusing circuits and the like.

FIG. 9B illustrates the example integration circuit, which may include only one current source (gm) and one capacitor (C), and one comparator (comp) and one switch (SW). In addition to reducing the number of current sources and capacitors, a fusing circuit may not be included in the example integration circuit, compared to the typical integration circuit.

Based on the result of the simulation, the example integration circuit may reduce the size of the integration circuit by about ⅙, compared to the size of the typical integration circuit.

The example integration circuit may be applied to various devices. As non-limiting examples, the example integration circuit may be applied to various kinds of switch control devices, LED backlight drive apparatuses, and display apparatuses.

Figure 10:
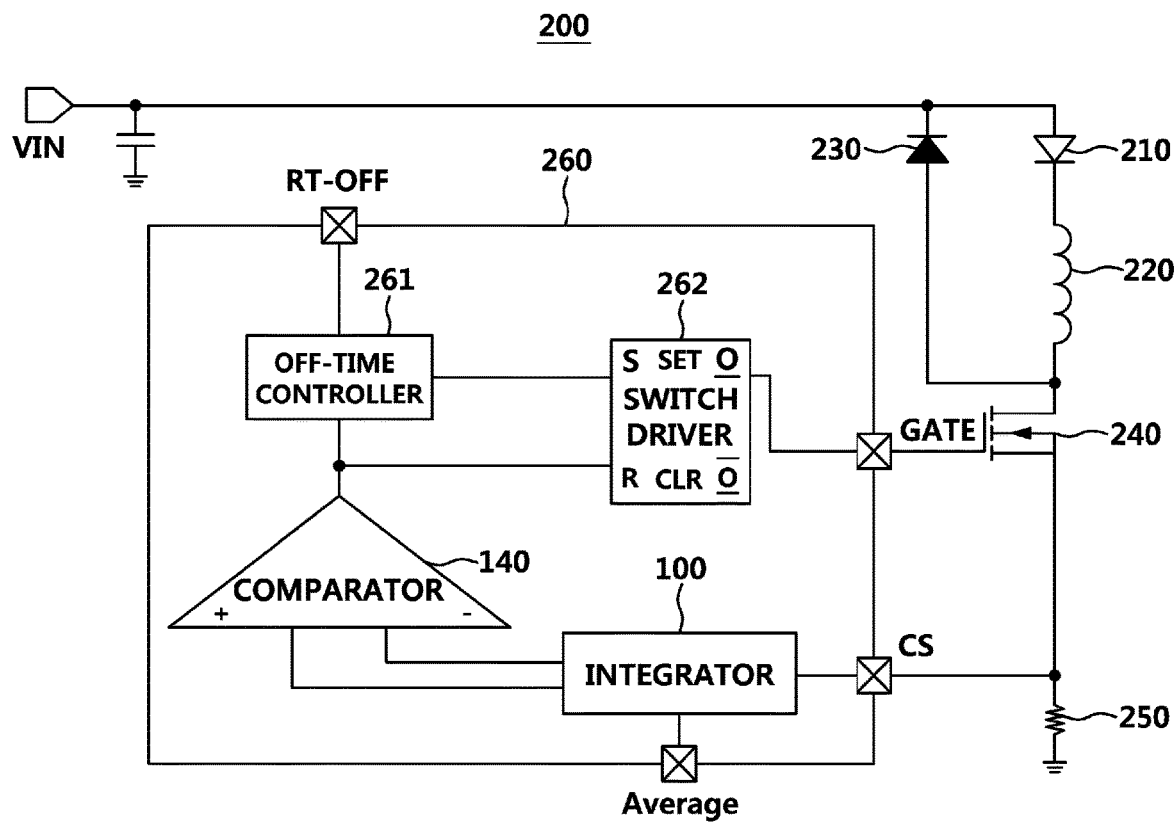
FIG. 10 illustrates an example of a circuit diagram of a converter having an integration circuit, in accordance with one or more embodiments.

FIG. 10 illustrates an example of a circuit diagram of a converter including an integration circuit, in accordance with one or more embodiments.

Referring to FIG. 10, in a non-limiting example, the example integration circuit may be configured in the converter 200. Specifically, the integrator 100 of FIG. 10 may correspond to the example integration circuit described above. Thus, the integrator 100 may include a current source 110, capacitor C 120, a voltage source bias 130, a switch 150 and a switch control logic unit 101.

The converter 200 may be configured with the integrator 100, the comparator 140, the off-time controller 261 that counts the off-time according to the output of the comparator 140, and a switch driver 262 which may include a SR latch that controls the operation of the current control switch 240 according to the outputs of the comparator 140 and the off-time controller 261.

The converter 200 may also include a load 210, which is connected in series with the input power (VIN) and an inductor 220 which stores or emits energy supplied through the input power (VIN) in accordance with the operation of the current control switch 240. The load 210 and the inductor 220 may be connected with a reflux diode 230 to form a current path (loop) that may supply the corresponding energy to the load 210 when the energy is emitted from the inductor 220. The converter 200 may also include a current measurement resistor 250 which is connected between one end of the current control switch 240 and the reference potential to measure the current flowing through the load 210.

In the converter 200 having such an example integration circuit, the integrator 100 may perform the integral calculation according to a control signal (i.e., a GATE signal) of the switch driver 262 that turns on the gate terminal of the current control switch 240. Since the current control switch 240 may receive a control operation of the off-time controller 261, the control signal may be an output signal of the off-time controller 261.

According to the example integration circuit and the control method described above, by providing an integration circuit that has a constant operating time, the average current control may be performed more accurately than the typical integration circuit.

The chip size may be minimized since it may be implemented with one current source and one capacitor. The chip size may be greatly minimized since the number of current sources and capacities may be reduced, and a fusing circuit used in the typical integration circuit may not be needed for the example integration circuit. Based on a result of the simulation, the chip size may be minimized by about ⅙ compared to the typical integration circuit.

Additionally, such a minimized chip size may increase the design efficiency of various apparatuses that implement the example integration circuit. The apparatuses may be, as non-limiting examples, switch control circuits, converters with switch control circuits, LED backlight drive apparatuses, display apparatuses and similar devices.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An integration circuit comprising:
   a current source configured to supply a variable current based on a difference between a reference voltage $V_{REF}$ and a current sensing voltage $V_{CS}$ that increases for a predetermined time;
   a capacitor connected in series with the current source;
   a voltage source bias connected in series with the capacitor;
   a switch configured to connect a first node between the current source and the capacitor and a second node between the capacitor and the voltage source bias; and
   a switch control logic unit configured to control an on/off operation of the switch, wherein an integral operation is performed by the current source and the capacitor by supplying the variable current to the capacitor when the switch is turned off, wherein when a transfer conductance value of the current source is gm, the variable current has a value of gm*($V_{REF}$−$V_{CS}$).

2. The circuit of claim 1, wherein the switch control logic unit comprises an inversion buffer and an AND gate, and wherein the integration circuit is configured to be in a non-operational state when an output of the AND gate is at a high level and the integration circuit is configured to be in an operational state when the output of the AND gate is at a low level.

3. The circuit of claim 1, wherein the second node of the voltage source bias is configured to maintain a constant value based on the voltage source bias.

4. The circuit of claim 1, wherein an integral value obtained at the first node from the integral operation appears in a semicircular shape that is symmetrical with respect to a time at which the reference voltage $V_{REF}$ and the current sensing voltage $V_{CS}$ are equal.

5. The circuit of claim 3, further comprising a comparator configured to compare a first integral value of the first node with a second integral value of the second node based on the integral operation.

6. The circuit of claim 1, wherein a turn-on time of the switch does not change even when a transfer conductance value (gm) of the current source is changed or when a size of the capacitor is changed.

7. The circuit of claim 1, wherein an operating time of the integration circuit does not change even when a transfer conductance value (gm) of the current source or a size of the capacitor is changed.

8. A control method of an integration circuit comprising a current source, a capacitor connected in series with the current source, a voltage source bias maintaining a constant value and connected in series with the capacitor, a switch configured to connect a first node between the current source and the capacitor and a second node between the capacitor and the voltage source bias, and a switch control logic unit configured to control an on/off operation of the switch, the method comprising:

supplying, by the current source, a variable current based on a difference between a reference voltage $V_{REF}$ that remains constant and a current sensing voltage $V_{CS}$ that increases for a predetermined time, to the capacitor to perform an integral operation;

performing a turn-on operation of the switch when an integral value of the integral operation and the voltage source bias are equal; and performing a turn-off operation of the switch when the integral value of the integral operation and the voltage source bias are not equal, wherein the switch is turned on to stop the integral operation, and the switch is turned off to start the integral operation.

9. The method of claim 8, wherein an increase and a decrease in the integral value are the same for a time when the reference voltage $V_{REF}$ and the current sensing voltage $V_{CS}$ are the same.

10. The method of claim 8, wherein a time at which the switch is turned on does not change even when a transfer conductance value (gm) of the current source is changed.

11. The method of claim 8, wherein a time at which the switch is turned on does not change even when a size of the capacitor is changed.

12. The method of claim 8, wherein an operating time of the integration circuit is constant when a transfer conductance value (gm) of the current source is changed, or a size of the capacitor is changed.

13. A switch controller comprising:

an integration circuit comprising a current source, a capacitor connected in series with the current source, a voltage source bias connected in series with the capacitor, a switch configured to connect a first node between the current source and the capacitor with a second node between the capacitor and the voltage source bias, and a switch control logic unit comprising an inversion buffer and an AND gate connected in series and configured to control an on/off operation of the switch;

a comparator configured to compare a first integral value of the first node with a second integral value of the second node based on an integral operation of the integration circuit, and output a switch-off signal SW_OFF to the switch control logic unit;

an off-time controller configured to count an off-time based on an output of the comparator; and a switch driver configured to control an operation of a current control switch based on the output of the comparator and the off-time controller, wherein the current source is configured to supply a variable current based on a difference between a reference voltage $V_{REF}$ and a current sensing voltage $V_{CS}$ that increases for a predetermined time, and wherein the integral operation is performed by the current source and the capacitor by supplying the variable current to the capacitor when the switch is turned off.

14. The switch controller of claim 13, wherein the integration circuit is configured to operate based on an output signal of the off-time controller.

15. The switch controller of claim 13, wherein the off-time controller is configured to output a logic signal, which has a predetermined level, to a set terminal of the switch driver after a predetermined time is counted based on an output signal of the comparator.

16. An integration circuit comprising:

a single current source configured to supply a variable current based on a difference between a reference voltage $V_{REF}$ and a current sensing voltage $V_{CS}$ that increases for a predetermined time;

a voltage source bias;

a single capacitor connected in series with the single current source, and configured to perform an integral operation with the single current source;

a switch configured to connect a first node between the single current source and the single capacitor with a second node between the single capacitor and the voltage source bias; and a switch control logic unit comprising an inversion buffer and an AND gate connected in series and configured to control on/off operations of the switch, wherein the integral operation is performed by the single current source and the single capacitor by supplying the variable current to the single capacitor when the switch is turned off.

17. The circuit of claim 16, further comprising a comparator connected to the first node and the second node, and configured to compare a first integral value of the first node with a second integral value of the second node based on the integral operation of the integration circuit, and output a switch-off signal SW_OFF to the AND gate of the switch control logic unit.

* * * * *